Figure 3:
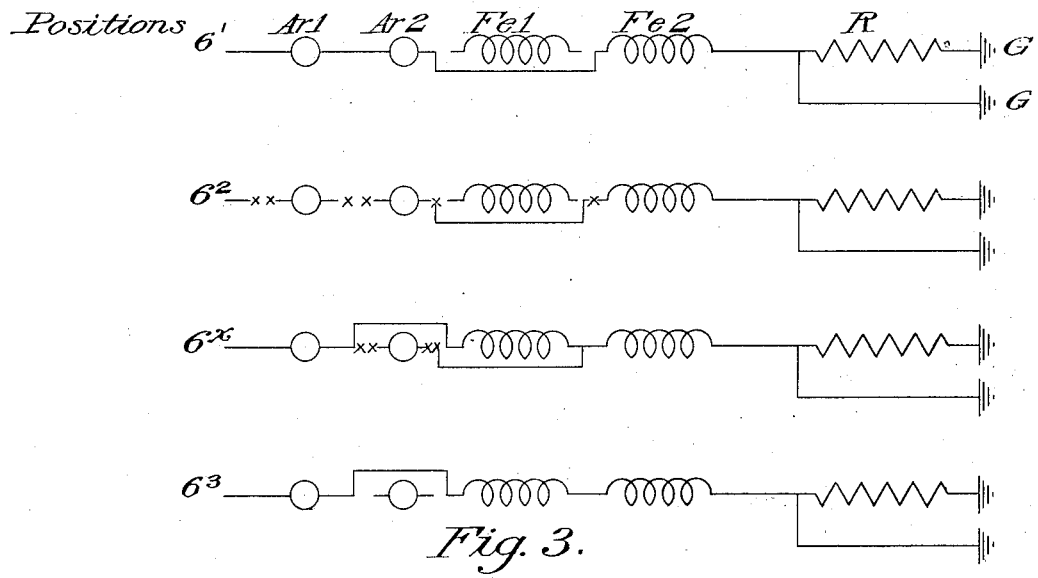

No. 735,893. PATENTED AUG. 11, 1903.
F. A. MERRICK.
CONTROL OF ELECTRIC MOTORS.
APPLICATION FILED JAN. 14, 1901.
NO MODEL. 2 SHEETS—SHEET 1.
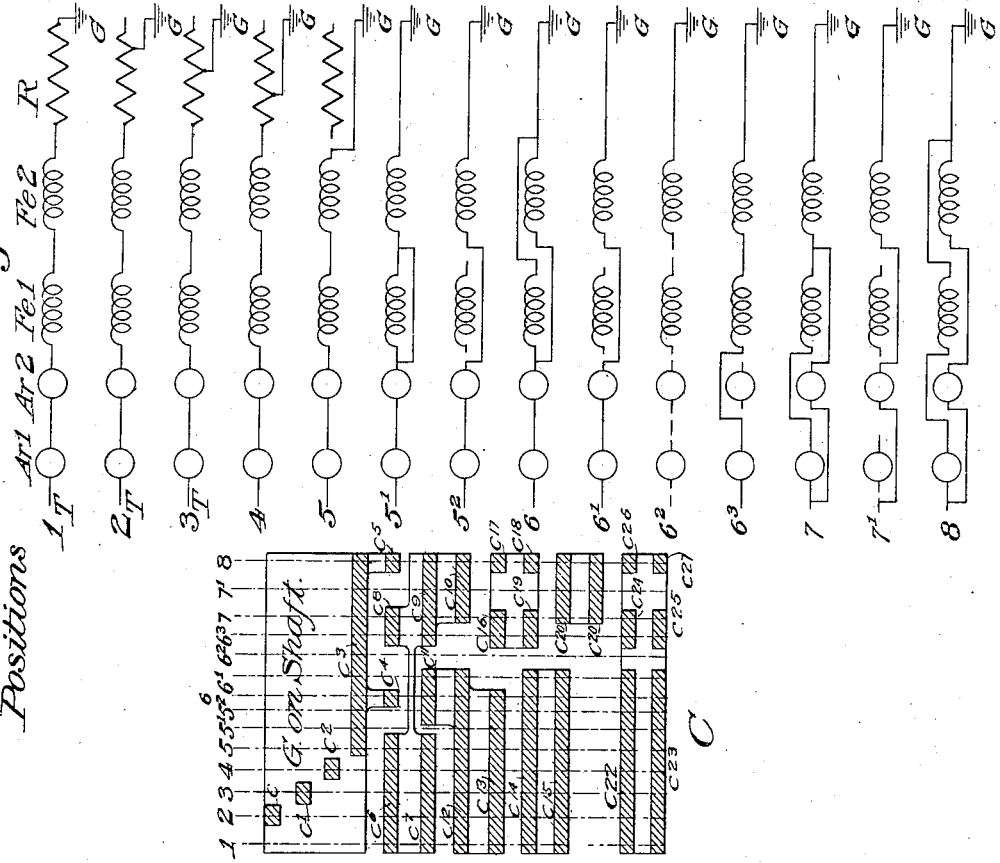
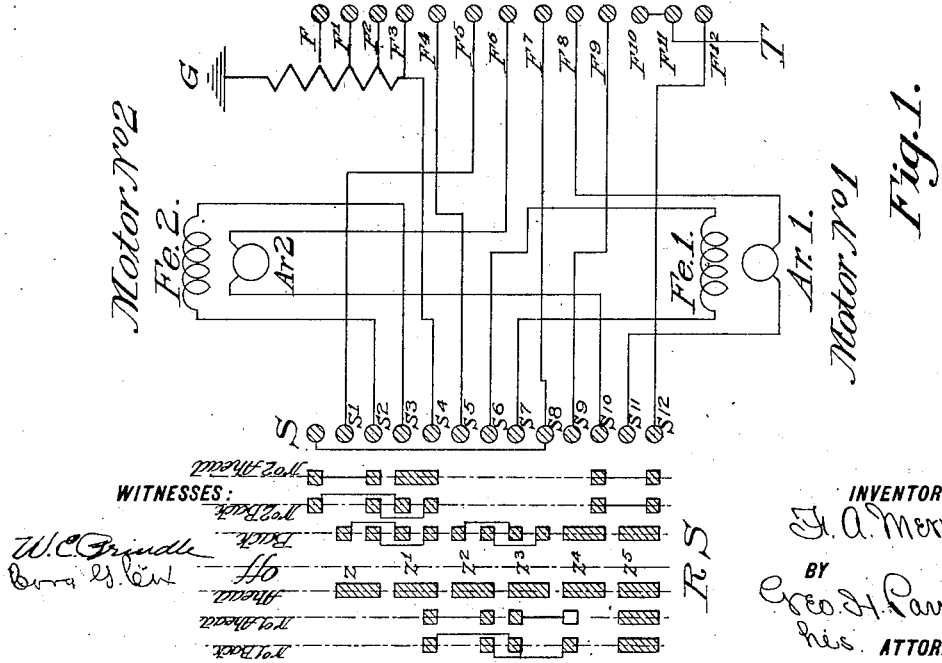
WITNESSES:
W. C. Brindle
[signature]
INVENTOR
F. A. Merrick,
BY
Geo. H. Parmelee,
his ATTORNEY.
THE NORRIS PETERS CO., PHOTO-LITHO., WASHINGTON, D. C.

No. 735,893. Patented August 11, 1903.

UNITED STATES PATENT OFFICE.

FRANK A. MERRICK, OF JOHNSTOWN, PENNSYLVANIA, ASSIGNOR, BY MESNE ASSIGNMENTS, TO WESTINGHOUSE ELECTRIC AND MANUFACTURING COMPANY, OF PITTSBURG, PENNSYLVANIA, A CORPORATION OF PENNSYLVANIA.

CONTROL OF ELECTRIC MOTORS.

SPECIFICATION forming part of Letters Patent No. 735,893, dated August 11, 1903.

Application filed January 14, 1901. Serial No. 43,163. (No model.)

*To all whom it may concern:*

Be it known that I, FRANK A. MERRICK, of Johnstown, in the county of Cambria and State of Pennsylvania, have invented a new and useful Improvement in Control of Electric Motors, of which the following is a full, clear, and exact description, reference being had to the accompanying drawings, which form a part of this specification.

My invention has relation to the control of electric motors, and is designed to provide an improved method of changing a pair of motors from series to parallel relation without the use of wasteful external resistance and by a series of steps which provide a nearly uniform acceleration in their speed and which avoid undesirable circuit conditions.

My invention more particularly relates to a system of motor control in which the motors are changed from series to parallel relation by first connecting their fields only in parallel, then shifting them to a relation in which one of the motors is shunted by the armature of the other motor whose field is in series with the first motor, and then finally connecting the two motors in parallel. In changing from the relation of parallel fields and series armatures to a relation in which one motor is shunted by the armature of the other motor it is of course necessary to change the armatures from series to parallel relation and the fields from parallel to series relation at a time when the motors are carrying considerable current and have attained considerable speed. The simplest and most obvious way of making this change is to entirely open the circuit through the motors and then reconnect them in the desired relations. There is no objection to this provided that the period of open circuit is sufficiently brief not to affect the speed or counter electromotive force of the motors. This, however, has not heretofore been possible in practice for the reason that if the controller be moved rapidly across the open-circuit position the arcs which form between the controller contacts and fingers on leaving the preceding position are apt to be maintained across the open-circuit point until the succeeding position is reached. The effect of this, as will be readily seen, is in a measure to superimpose one circuit condition upon another in a manner likely to result in serious confusion of circuits and very probably give a short circuit from trolley to ground. This is more apt to occur during the backward movement of the controller from the position of parallel armatures to a position of parallel fields, the arcs in the controller tending to maintain the series position of the fields up to the time that the proper contacts in the controller are engaged to effect a multiple connection of the fields, in which case there can result a direct short circuit from trolley to ground. Consequently, in order to avoid results of this character, it has been necessary to make the point of open circuit sufficiently wide on the controller-drum to insure the extinguishment of all arcs in the controller while moving across this position. This, however, leaves the circuit open for a period sufficiently long to affect the speed and especially under the condition of a heavy load, and the effect upon the car is noticeable.

My present invention is more particularly designed to provide a method of control in which the effect of opening the circuit in passing from the position of parallel fields to parallel armatures or the reverse is practically eliminated in so far as any objectionable confusion of circuits or effect upon the car is concerned.

With this and the previously-stated objects in view my invention, broadly considered, consists in the method of carrying a pair of motors across an open-circuit position on the controller by making the period of open circuit of brief duration and preceding and following such position in both directions of movement of the controller by circuit relations of the motors or motor elements of such character as to avoid short circuits and other undesirable circuit conditions which might otherwise result by reason of the fact that arcs formed between the controller fingers and contacts might be maintained across the open-circuit position, and thus tend to superimpose one set of circuit connections maintained through such arcs upon another set established by the controller-contacts, such preceding and following circuit relations being, furthermore, such that the conditions which may result from such a superimposition of connections will by their nature and in view of the resistance of the maintained arcs be to a certain extent beneficial.

More specifically considered my invention consists in the employment of the above-described method in changing a pair of motors from a relation in which their fields are in parallel with each other and in series with their series-connected armatures to a relation in which the armature of one motor is in parallel with the other motor with its own field in series with that motor; and in doing this I preferably precede the open-circuit position by a circuit condition in which both armatures and one field are in series, with the other field open-circuited. In the reverse movement of the controller I preferably precede the open-circuit position by a circuit relation in which one armature and both fields are in series and the other armature is open-circuited.

My invention also consists in certain steps and combinations of steps and in the complete method of control, all as hereinafter described, and pointed out in the appended claims.

Figure 4:
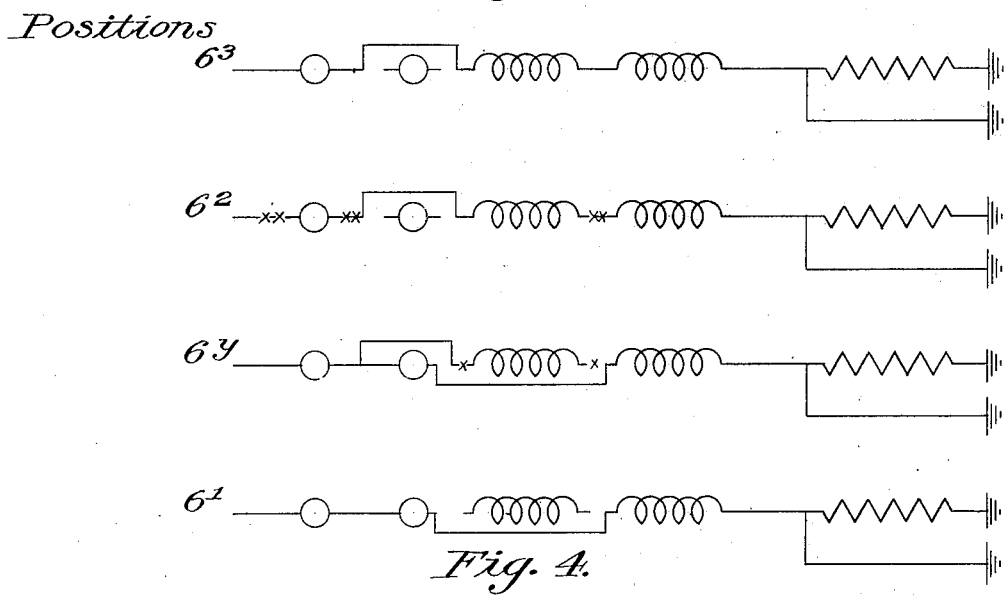

In the accompanying drawings, Figure 1 is a diagram showing a development of a controller and circuit relations such as may be employed in the practice of my invention; and Fig. 2 is a view showing graphically the motor combinations which are actually effected by the engagement of the controller-contacts in their several different positions. Fig. 3 is a similar view showing the circuit relations resulting from arcs in the controller at certain positions thereof during its forward movement, and Fig. 4 shows the relations corresponding to the same position during the return movement.

In the drawings the armature-coils of one motor, hereinafter referred to as "motor No. 1," are designated $A^{r'}$, and the armature-coils of the other motor, hereinafter referred to as "motor No. 2," are designated $A^{r2}$, the field-coils of the two motors being respectively designated $F^{e'}$ and $F^{e2}$.

R designates the external resistance for use in the motor-circuit in starting from and returning to a position of rest and at such time only.

Referring now more particularly to Fig. 2, the first four positions represent the usual resistance steps which I prefer to employ in starting the motors. Position 5 shows the resistance as having been entirely short-circuited and the motors in straight series. As will be seen from this figure, the resistance remains entirely short-circuited during the entire further forward movement of the controller and is not again brought into use until position 4 on the return movement is reached. The next running position is that shown in Fig. 6, wherein the field-coils of the two motors are connected in parallel and in series with the series-connected armatures. To pass from the relation of position 5 to the relation of position 6, the field-coil $F^{e'}$ of motor No. 1 is first short-circuited and then removed from circuit, as shown at positions 5' and 5², and this field is then connected in parallel with that of the other motor. The effect of position 6 is of course to reduce by approximately three-fourths the total ohmic resistance of the fields, and thereby proportionately reduce their strength relative to the armatures, each of which is carrying the current of both fields. There is therefore a considerable increase in speed at this position. The next running position is that shown at 7, wherein the armature of motor No. 2 is placed in shunt to motor No. 1 with its field in series therewith. This position again gives a considerable further increase in speed, since the armatures are now in parallel. Both fields being in series, however, undue acceleration is prevented and the high counter electromotive force of armature No. 2, due to the strength of its field, prevents it from taking an undue proportion of the current.

In passing from position 6 to position 7 I first remove from circuit field-coil $F^{e'}$, and immediately thereafter I open the motor-circuit at a plurality of points, as shown at 6², and immediately thereafter reëstablish the circuit, as shown at position 6³, through one of the armatures and both the fields.

In passing from position 6' to position 6² with an ordinarily rapid movement of the controller-handle it is probable that in many cases, under certain conditions of load, &c., the arcs which form between the controller contacts and fingers tend to maintain the circuit relations of position 6' across the open-circuit position 6², as shown at position 6² in Fig. 3, and in a measure superimpose the connections of that position upon the connections established at position 6³, thereby, in effect, momentarily placing the armature of motor No. 2 in parallel with the field of motor No. 1, as indicated at position 6ˣ in Fig. 3, so that, in effect, the motor-circuit will not be entirely opened at this position, although there will be no actual contact engagement to maintain said circuit.

The shunting of the armature of one motor with the live field of the other motor would not be a desirable running relation, since that armature would then be acting in a closed local circuit, which might cause the motors to "buck." As a transitory condition, however, of very brief duration, and furthermore inasmuch as it is protected by the resistance of the several arcs (indicated by the small crosses in Fig. 3) through which the relation is maintained, it is not objectionable and forms a very satisfactory step in the desired change. The relation of position 6³ is therefore a very satisfactory one at this time. It is further advantageous inasmuch as by connecting in the field $F^{e2}$ in advance of its armature $A^{r2}$ an opportunity is given said field to build up its strength somewhat before the armature is connected in, and, further, this field has the effect of preventing a tendency of the other motor to buck at this time. This action I attribute to the self-induction of the field $F^{e2}$, the "kick" of which tends to momentarily check the rush of current through the other motor. The armature $A^{r2}$ is then connected in shunt with the other motor. The motors are next changed to parallel relation as a whole through the intermediate step shown at position $7'$, in which the circuit of the armature $A^{r'}$ and field $F^{e'}$ is broken at a number of points and they are then reconnected in parallel relation with the other motor.

The purpose of the temporary relation shown at position $6'$ is mainly to prevent any confusion of circuits which might otherwise result in the quick return passage from position $6^3$, in which the fields are in series, to position 6, in which they are in parallel, due to the maintenance of arcs in the controller across position $6^2$. It will be readily seen that if such arcs should maintain the series relation between the two fields (shown in Fig. 4) until and after the contacts of the controller had established the multiple connection of position 6 there would result a short circuit to ground around the fields of both motors. This is prevented by the temporary relation established at position $6'$. Just at the time the controller-fingers come into engagement with the contacts which they bear upon at this position the continued maintenance through the arcs of the connections of position $6^3$ results in placing the armature $A^{r2}$ in parallel with field $F^{e'}$, (see Fig. 4,) as on the forward movement. By the combination, therefore, of the three steps shown at positions $6'$, $6^2$, and $6^3$ I am enabled to make the period of open circuit at $6^2$ of such very brief character as to have practically no effect whatever upon the car and at the same time I avoid the confusion of circuits and undesirable circuit conditions.

Any suitable type of controller may be employed for carrying my invention into practice. I prefer, however, to employ the usual rotary-drum type.

In the diagram Fig. 1 the letter C designates a development of a controller-drum of this type carrying a plurality of contacts designated by the reference characters $c$ $c'$ $c^2$, &c., to and including $c^{27}$.

F F' $F^2$, &c., to and including $F^{12}$, designate a series of fixed contact-fingers for engagement with the said contacts in the several positions of the drum. (Indicated by a number of broken vertical lines on the development.) The casting which carries the upper group of contacts $c$ to $c^{25}$, inclusive, is grounded through the shaft of the controller. (Not shown.)

T indicates the trolley connection.

R S designates the development of a combined reversing and motor cut-out switch, which is also of well-known type and which is here shown only for the purpose of enabling the complete motor-circuit to be traced. For this purpose it will be sufficient to consider the series of contact-fingers S S' $S^2$, &c., to $S^{12}$, inclusive, as being in engagement with the vertical row of contacts on the line marked "ahead" and designated as $z$, $z'$, $z^2$, $z^3$, $z^4$, and $z^5$.

The circuit at position 1 may be traced as follows: from trolley T to finger 11, contacts $c^{22}$ $c^{23}$, finger $F^{12}$, finger $S^{12}$, contact $c^5$, finger $S^{11}$, armature $A^{r'}$, finger $F^8$, contacts $c^{14}$ $c^{15}$, finger $F^9$, finger $S^9$, contact $c^4$, finger $S^{10}$, armature $A^{r2}$, finger $F^6$, contacts $c^{12}$ $c^{13}$, finger $F^7$, finger $S^8$, contact $c^3$, finger $S^7$, field $F^{e'}$, finger $S^6$, contact $c^2$, finger $S^5$, finger $F^4$, contacts $c^6$ $c^7$, finger $F^5$, finger $S'$, contact $z$, finger $S^2$, field $F^{e2}$, finger $S^3$, contact $z'$, finger $S^4$, to and through resistance R to ground, thus connecting both motors in series with the resistance R.

The only change effected in passing through positions 2, 3, 4, and 5 is to short-circuit successive sections of the resistance R by means of the successive engagement of the grounded contacts $c$, $c'$, $c^2$, and $c^3$ with the respective fingers F, F', $F^2$, and $F^3$. The contact $c^3$ is shown as extending continuously from the position 5 to the final position, and thereby maintains the short circuit around the resistance through all the positions of the controller subsequent to position 4.

In passing from position 5 to position 6 there occurs the transitory position $5'$, in which the contact-finger $F^5$ is lapping over into engagement with both contacts $c^7$ and $c^{11}$, the effect of which is to establish a short circuit around the field $F^{e'}$, as will be readily seen, and when the transitory position $5^2$ is reached the said finger $F^5$ entirely loses its engagement with the contact $c^7$, and thus removes said field entirely from circuit.

At position 6 the contact-fingers $F^8$, $F^9$, $F^{11}$, and $F^{12}$ are still in engagement with the respective contacts $c^{14}$, $c^{15}$, $c^{22}$, and $c^{23}$, and the series circuit through the two armatures remains as before. The current from the negative brush of the armature $A^{r2}$ by way of the finger $F^6$ has, however, at this position two paths, one being by way of contact $c^{13}$, finger $F^7$, finger $S^8$, contact $z^3$, finger $S^7$, field $F^{e'}$, finger $S^6$, contact $z^2$, finger $S^5$, finger $F^4$, to grounded contact $c^4$, and the other path being by contact $c^{10}$, finger $F^5$, finger $S'$, contact $z$, finger $S^2$, field $F^{e2}$, finger $S^3$, contact $z'$, finger $S^4$, finger $F^3$, to grounded contact $c^3$. The two fields are thus in parallel with each other and in series with the armatures.

In passing from position 6 to position 7 contact-fingers $F^4$ and $F^7$ lose their engagement with the contacts $c^4$ and $c^{13}$, and thus open the circuit of the field $F^{e'}$ at two points. This is effected when the contact-fingers are on the line $6'$.

At the position $6^2$ there are no contacts in engagement except the grounded resistance contact $c^3$, and the motor-circuit is broken at a plurality of points. It will be noted, however, that this open-circuit position occupies but a comparatively short space on the periphery of the drum and is quickly followed by the position $6^3$. In moving across the position, however, with ordinary rapidity arcs may hang between the contact fingers $F^5$, $F^6$, $F^8$, $F^9$, $F^{11}$, and $F^{12}$, and the corresponding contacts $c^{11}$ $c^{12}$ $c^{14}$ $c^{15}$ $c^{22}$ $c^{23}$, and these arcs will, as above stated, tend to maintain the circuit connections of position $6'$ at the time said fingers commence to make engagement with the contacts of position $6^3$ to momentarily give the connections shown at position $6^x$ in Fig. 3. The circuit proper when position $6^3$ is fully reached is as follows: from trolley connection T to finger $F^{11}$, contacts $c^{24}$ $c^{25}$, finger $F^{12}$, finger $S^{12}$, contact $z^5$, finger $S^{11}$, armature $A^{r'}$, finger $F^8$, contacts $c^{19}$ $c^{16}$, finger $F^7$, finger $S^8$, contact $z^3$, finger $S^7$, field $F^{c'}$, finger $S^6$, contact $z^2$, finger $S^5$, finger $F^4$, contacts $c^8$ $c^9$, finger $F^5$, finger $S'$, contact $z$, finger $S^2$, field $F^{c2}$, finger $S^3$, contact $z'$, finger $S^4$, finger $F^3$, to grounded contact $c^3$.

At position 7 the circuit through armature $A^{r'}$, fields $F^{c'}$ and $F^{c2}$ remains the same as traced for position $6^3$, but the engagement of the contact-fingers $F^9$ and $F^{10}$ with the contacts $c^{20}$ and $c^{21}$ and the engagement of the finger $F^6$ with the contact $c^{10}$ puts the armature $A^{r2}$ in shunt with the armature $A^{r'}$ and field $F^{c'}$.

At position $7'$ fingers $F^{11}$ and $F^{12}$ have lost their engagement with contacts $c^{24}$ and $c^{25}$, thus breaking the circuit leading to one brush of the armature $A^{r2}$. Fingers $F^7$ and $F^8$ have also lost engagement with the contacts $c^{16}$ and $c^{19}$, thus breaking the circuit to the other brush of said armature and also the circuit leading to one terminal of field $F^{c'}$, the circuit to the other terminal being also broken by finger $F^4$, leaving the contact $c^8$.

At position 8 the contact-fingers $F^3$ to $F^{12}$, inclusive, are all engaged with contacts and the circuit may be traced as follows: from trolley T to contact-finger $F^{11}$ where there are two paths open to the current, the one being by way of contacts $c^{26}$ $c^{27}$, finger $F^{12}$, finger $S^{12}$, contact $z^5$, finger $S^{11}$, armature $A^{r'}$, finger $F^8$, contacts $c^{18}$ $c^{17}$, finger $F^7$, finger $S^8$, contact $z^3$, finger $S^7$, field $F^{c'}$, finger $S^6$, contact $z^2$, finger $S^5$, finger $F^4$, to grounded contact $c^5$. The other path is to finger $F^{10}$, contacts $c^{21}$ $c^{20}$, finger $F^9$, finger $S^9$, contact $z^4$, finger $S^{10}$, armature $A^{r2}$, finger $F^6$, contacts $c^{10}$ $c^9$, finger $F^5$, finger $S'$, contact $z$, finger $S^2$, field $F^{c2}$, finger $S^3$, contact $z'$, finger $S^4$, finger $F^3$, to grounded contact $c^3$. The two motors are thus connected in parallel.

On the return movement from position $6^3$ to position $6'$ arcs will tend to hang between the contacts $c^8$, $c^9$, $c^{16}$, $c^{17}$, $c^{24}$, and $c^{25}$ and the corresponding fingers, thereby maintaining the circuit connection of position $6^3$ when position $6'$ is first reached, thereby again momentarily placing the armature $A^{r2}$ in parallel with the field $F^{c2}$, as shown at position $6^y$ in Fig. 4. As above stated, however, this condition will be a very brief one and the resistance of the arcs in series will also operate to hold back the current flow, so that the last condition instead of becoming an objectionable one, as it might be were it established for a somewhat greater length or time or by means of a positive engagement of the controller-contacts, becomes a beneficial one.

I do not wish to be understood as stating that in all cases the formation of arcs in the controller will have the effects above described, since under a light load or by reason of other conditions the arcs, or some of them, may be entirely extinguished in passing across the open-circuit positions. If this is the case, however, the period of open circuit is so brief and the adjacent steps are of such character that the effect on the car of the open circuit is practically eliminated, and if the arcs are maintained objectionable effects are obviated and the resulting circuit conditions to some extent beneficially utilized.

The foregoing method of control is also applicable to more than two motors, where, as is customary, the motors are handled in groups by effecting the circuit changes described in each group either simultaneously or successively.

As above indicated, I do not limit myself to the use of any particular form of controller in the practice of my invention.

I do not claim the motor combinations or steps effected at position 7 except in connection with the other steps, as I believe that combination or step to be the invention of Frank W. Garrett, of Johnstown, Pennsylvania, as described and claimed in his pending application for patent, Serial No. 28,324.

Having thus described my invention, what I claim, and desire to secure by Letters Patent, is—

1. The herein-described method of carrying a pair of electric motors across an open-circuit position of the controller, which consists in making the period of open circuit of brief duration, and preceding and following such open-circuit position by circuit relations whose connections can be superimposed or combined without producing short circuits or other undesirable circuit conditions.

2. The herein-described method of carrying a pair of electric motors across an open-circuit position of the controller, which consists in making the period of open circuit of brief duration, and preceding such step in one direction of the controller with a motor relation in which the armatures of both motors are in series with the field-coils of one of the motors with the field-coils of the other motor open-circuited, and following the first-named step with a relation in which the armature of one motor is in series with the field-coils of both motors and the other armature is open-circuited.

3. In the control of electric motors, the method of changing a pair of motors from a relation in which their fields are in parallel with each other and in series with their series-connected armatures, to a relation in which the armature of one motor is in parallel with the other motor and its field in series therewith, which consists in open-circuiting the field of one motor, then breaking the positive circuit of the remaining motor elements for a period of brief duration, and then establishing a relation of the motor elements in which one armature is open-circuited and the other elements are connected all in series, and then connecting in said armature in parallel with the field and armature of the other motor.

4. In the control of electric motors, the method of changing a pair of motors from a relation in which the fields are in parallel and the armatures in series, to a relation in which the armatures are in parallel and the fields in series, which consists in open-circuiting one of the fields, then opening the motor-circuit at a number of points, then immediately connecting the fields of both motors and the armature of one motor in series, and then connecting in the other armature in the desired relation.

5. In the control of electric motors, the steps which consist in connecting the armatures of both motors and the field of one motor in series with each other, with the field of the other motor open-circuited, then opening the circuit at a number of places substantially simultaneously, and immediately thereafter reëstablishing a motor-circuit in which one armature and both fields are in series, the period of open circuit being sufficiently brief and made under such conditions that arcs formed in the controller may tend to maintain the preceding circuit conditions across the open-circuit period.

6. In the control of electric motors, the steps which consist in connecting the armatures of both motors and the field of one motor in series with each other, with the field of the other motor open-circuited, then opening the circuit at a number of places substantially simultaneously, and immediately thereafter reëstablishing a motor-circuit in which one armature and both fields are in series, the period of open circuit being sufficiently brief and made under such conditions that arcs formed in the controller may tend to maintain the preceding circuit conditions across the open-circuit period, and may combine with the new connections then established to momentarily effect a circuit relation in which the two armatures and one field are in series, with the second armature shunted by the field of the other motor.

7. The method of controlling a pair of electric motors, which consists in starting them from a position of rest connected in series with each other and with external resistance, gradually and finally entirely removing the resistance from the circuit, then connecting the field-coils of the two motors in parallel with each other and in series with the series-connected armatures, then opening the circuit through one of the fields, then breaking the circuit through the remaining elements at a number of points in series and immediately thereafter reëstablishing a circuit in which one armature and both fields are in series, then connecting in the other armature in parallel with the field and armature of the other motor, and then connecting both motors as a whole in parallel.

8. The method of changing a pair of electric motors from series to parallel relation, which consists in first connecting the fields only in parallel, then opening the circuit through one of the fields, then opening the circuit through the other motor elements at a number of points, then immediately connecting the two fields and one of the armatures in series, then connecting the other armature with the circuit in parallel relation to the other armature and field, and finally connecting the two motors as a whole in parallel.

9. The method of carrying a pair of electric motors across an open-circuit position of the controller, which opens the circuit in so far as any positive engagement of the controller-contacts is concerned, but under conditions which make it possible for the circuit to be nevertheless maintained through arcs at the controller-contacts, and preceding and following such open-circuit position by circuit relations of the motors or motor elements whose connections can be superimposed or combined without producing short circuits or other undesirable circuit conditions.

10. In the control of electric motors, the steps which consist in connecting the armatures of two motors and the field-coils of one motor all in series, with the field-coils of the other motor removed from circuit, then opening the circuit briefly at a number of points, and then connecting the fields of both motors and the armatures of one of them all in series, with the other armature out of circuit.

In testimony whereof I have affixed my signature in presence of two witnesses.

FRANK A. MERRICK.

Witnesses:
CORA G. COX,
H. W. SMITH.